May 15, 1923.
S. H. BOITNOTT
1,455,422
DIRECTION INDICATOR FOR MOTOR VEHICLES
Filed April 18, 1921　　2 Sheets-Sheet 1
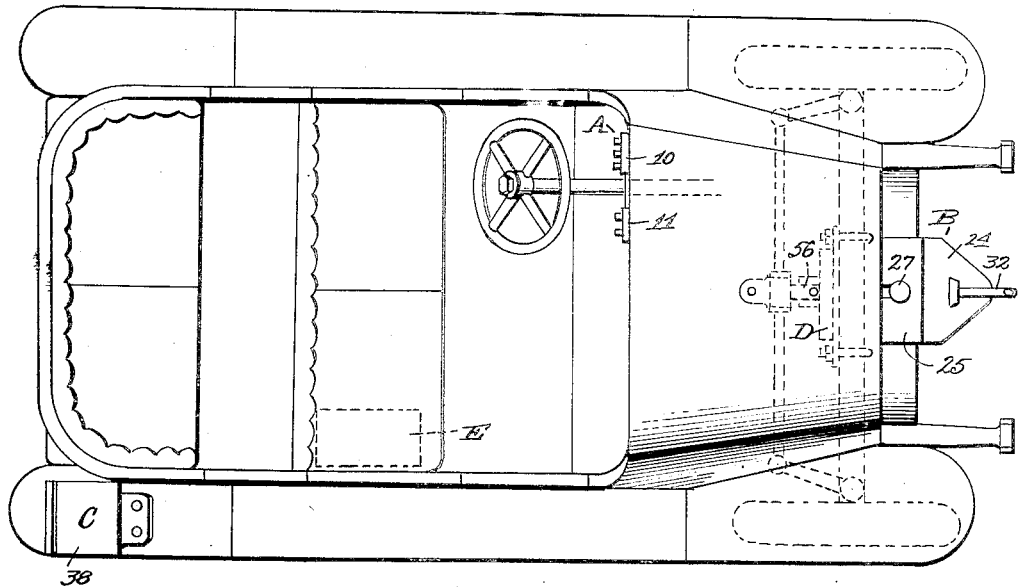
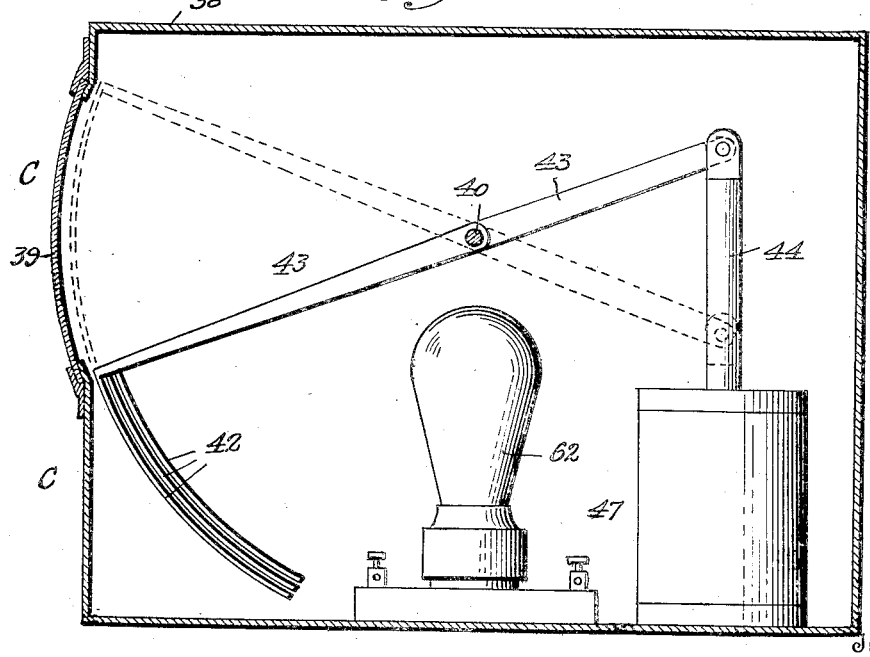
Inventor
Samuel H Boitnott
By Davis & Davis
Attorneys May 15, 1923.
S. H. BOITNOTT
1,455,422
DIRECTION INDICATOR FOR MOTOR VEHICLES
Filed April 18, 1921        2 Sheets-Sheet 2
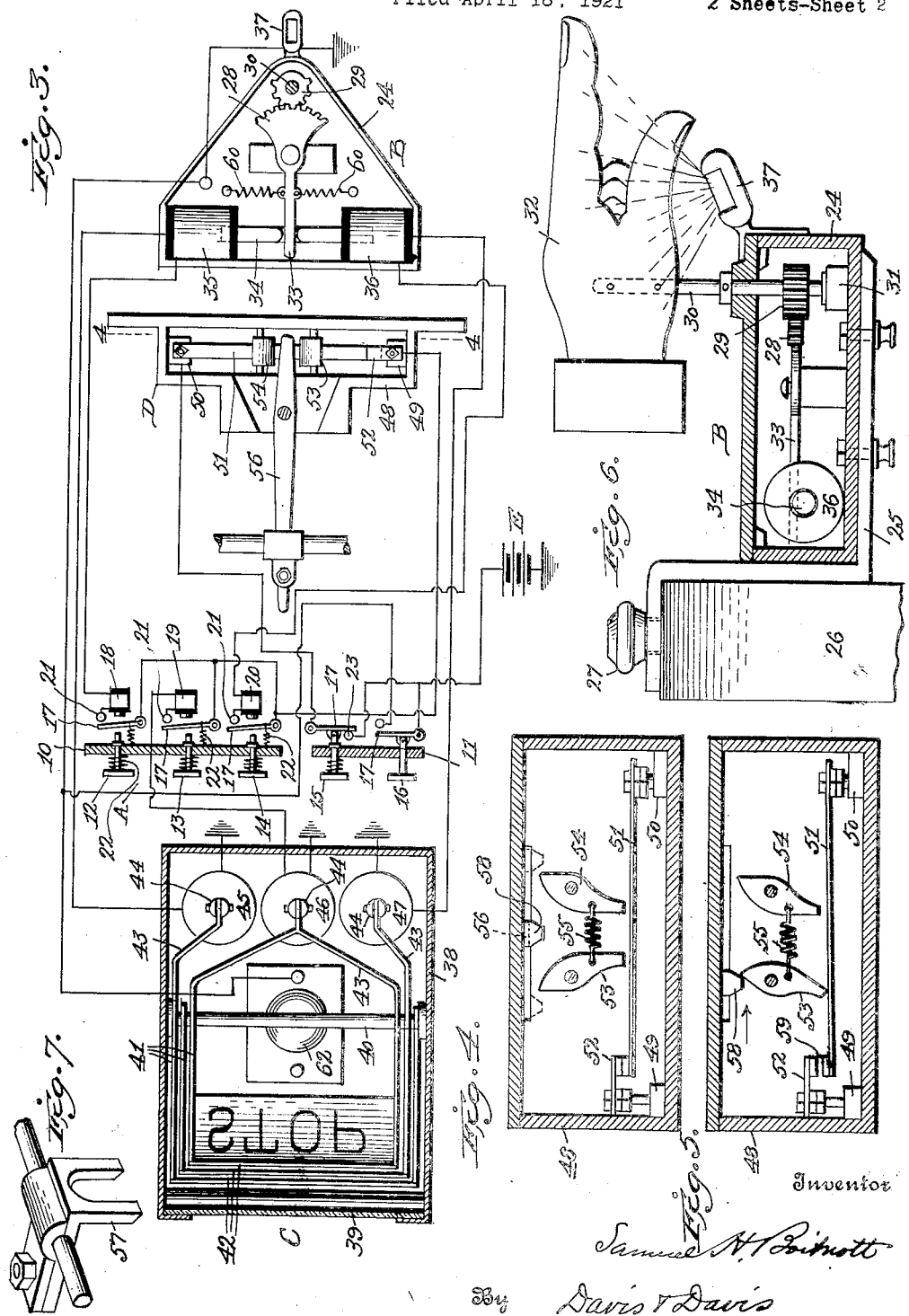
Inventor
Samuel H. Boitnott
By Davis & Davis
Attorneys

Patented May 15, 1923.

UNITED STATES PATENT OFFICE.

SAMUEL H. BOITNOTT, OF ROANOKE, VIRGINIA.

DIRECTION INDICATOR FOR MOTOR VEHICLES.

Application filed April 18, 1921. Serial No. 462,318.

*To all whom it may concern:*

Be it known that I, SAMUEL H. BOITNOTT, a citizen of the United States of America, and a resident of Roanoke, county of Roanoke and State of Virginia, have invented certain new and useful Improvements in Direction Indicators for Motor Vehicles, of which the following is a full and clear specification.

This invention relates to improvements in traffic guides and signals for motor-vehicles and has for its particular object to provide a device of this character which, after being set for a certain movement, will be automatically returned to normal position by the steering mechanism.

A further object of this device is to provide means for electrically operating the several signals and controlling the operating means by circuit-closing devices located on or near the dash-board.

These and other objects hereinafter set forth are attained by the means illustrated in the accompanying drawings, in which—

Fig. 1 is a plan view of a motor-vehicle chassis showing the improved signal apparatus applied thereto;

Fig. 2 is a vertical longitudinal section of the rear sign case;

Fig. 3 is a plan view of the several elements of the device with their tops removed and showing diagrammatically the electrical connections therebetween;

Fig. 4 is a vertical section of the automatic resetting device taken on the line 4—4 of Fig. 3;

Fig. 5 is a view similar to Fig. 4 showing the parts in another position;

Fig. 6 is a vertical section of the pilot signal; and

Fig. 7 is a detail view of the drag-link clamp.

Similar reference-numerals on all of the figures of the drawings designate like parts.

In the preferred embodiment of the invention, the device consists of a controller A mounted on the dash-board, a pilot-signal B mounted on the radiator at the front of the vehicle, a sign-signal C mounted on the rear fender, a circuit-breaker or resetter D mounted on the front axle, and a battery E fixed to any convenient part of the frame.

The controller preferably consists of the switch-plates 10 and 11 suitably mounted on the dash-board and having mounted thereon a series of push-buttons 12, 13, 14, 15 and 16, all of which except button 16 are normally held outwardly by springs mounted on the stems of the buttons between the heads thereof and the switch-plates. The inner ends of the stems of each of these buttons are adapted to engage and operate a pivoted leaf 17 adapted for electrical connection with a stationary contact to complete an electrical circuit to attain certain results. Located adjacent the pivoted leaves 17 of the buttons 12, 13 and 14 are the magnets 18, 19 and 20, which are energized when their circuits are closed by the engagement of these leaves 17 with the contacts 21 to thus retain the leaves 17 in a closed position until the particular circuit is broken at another point, when the springs 22 will return the leaves 17 to their normal open position.

Leaf 17 of button 15 is normally in engagement with its contact 23 and is pivotally connected with the stem of the button, so that the button-spring will serve to hold the leaf in its contacting position.

Leaf 17 of button 16 is also pivotally connected to the stem of the button to operate therewith and is frictionally supported in either closed or open position.

Pilot-signal B embodies a casing 24 suitably mounted on a bracket 25 which is supported upon the top of the radiator 26 and is secured in position preferably by the cap 27 of the filling-opening. Within the casing 24 is pivotally mounted a toothed-segment 28 which engages a gear-wheel 29 secured to a vertically-disposed shaft 30 whose lower end is suitably mounted in a bearing-block 31, its upper end extending above the casing 24 and having secured to it the semaphore 32 formed preferably in the shape of a hand with a pointing index-finger. Segment 28 is provided with rearwardly-extending arm 33 which is adapted to lie between two shoulders formed on a magnetic core 34 that has both of its ends engaging in the magnets 35 and 36 mounted within the casing of the pilot-signal. When either magnet 35 or 36 is energized, the core is correspondingly attracted and the segment is moved to rotate the semaphore in one direction or the other. A lamp 37 is preferably mounted on the pilot-casing beneath the semaphore, so that when the lamp is lighted it will reflect its rays upwardly and illuminate the signal.

Sign-signal C, mounted at the rear end of the vehicle, preferably consists of a casing 38 having its rear side provided with an opening which is covered by a concavo-convex glass 39. A shaft 40 is preferably mounted on the sides of the casing 38 and extends transversely thereof, and has mounted to rock thereon the sign-arms 41 which are provided at their outer ends with transparent signs 42, each having one of the words "Right," "Left," "Stop" marked thereon. The signs are preferably shaped similar in cross-section to the glass 39, so that they will nest closely together in the lower portion of the casing below the glass and can move in concentric lines with the axis of the supporting-shaft 40. Arms 43 are extended from each of the signs to points on the opposite side of the shaft from the signs and at their ends are pivotally connected to the magnetic cores 44 engaged in the magnets 45, 46 and 47 suitably secured within the casing 38.

Circuit-breaker D preferably consists of a casing 48 preferably secured to the front axle of the vehicle, in which are secured suitable insulating supports 49 and 50. Secured to support 50 is a spring contact-arm 51, which is normally in engagement with a contact-plate 52 and is adapted to be moved out of engagement by either of the pivoted cams 53 or 54, which are normally retained in inoperative position by a spring 55 connecting the lower ends of the cams. These pivoted cams 53 and 54 are operated by an arm 56 which is pivoted intermediate its length and whose rear end is engaged by a fork 57, which is suitably clamped to the drag-link of the steering mechanism of the vehicle. The front end of the arm 56 extends forwardly from its pivot point and extends between the pivoted cams 53 and 54 and is provided with a downwardly-projecting nose 58 which is adapted to engage the extreme upper ends of the cams when moved laterally in either direction. Cams 53 and 54 are formed with curved adjacent sides which will permit the nose 58 to tilt and move easily beyond them. On their opposite sides, the cams are formed with vertical edges adapted to be engaged by the nose 58 on its return movement to normal position and to forcibly operate the lower ends of the cams against the contact-arm 51 to break the circuit.

Constructed as thus described and with the parts in normal position, that is, with the rear signs down and the pilot-signal pointing straight ahead, the operation is as follows:

The driver of the vehicle, expecting to turn the next corner to the left, pushes button 12 and forces leaf 17 into engagement with contact 21, which closes the electrical circuit extending from the grounded battery E through restore-switch controlled by button 15 to and through automatic circuit-breaker D, through switch controlled by the button 12, through magnet 18 which has become energized and retains its leaf in the closed position, then to magnet 35 in the pilot-signal which operates the core 34 and segment 28 and turns the semaphore to the left; then from magnet 35 to magnet 45 in the rear signal-box, and finally to the ground. This also energizes magnet 45 and draws the core downwardly, which lifts the sign 42 bearing the "Left" indication. These signals are set by the operator anytime before reaching the desired turn, and they remain set while turning, but immediately upon operating the steering-gear to again assume a straight-ahead direction, the automatic circuit-breaker, through the drag-link and arm 56, operates one of the cams 53 or 54 (depending on which direction the car has been turned toward) to cause it to flex the contact-arm and break the circuit as shown at 59 in Fig. 5 of the drawing. Immediately upon the breaking of the circuit, magnet 18 is deenergized and the spring will restore its leaf 17 to normal position, when magnet 45 will be deenergized, allowing the "Left" sign to fall, and magnet 35 will also be energized, which will allow one of the springs 60 to restore the pilot-semaphore to its normal straight-ahead position.

To set the signals for a "Right" turn, button 14 will be pressed and the circuits will be the same as for the left turn, except that magnets 20, 36 and 47 will be energized, which will operate the left direction-indicating means. The "Stop" signal is only indicated at the rear of the machine by one of the sign-signals, and, as in the other instances, the circuit of the "Stop" signal extends through the automatic circuit-breaker D and the manually-operated switch-breaker controlled by button 15, so that either the "Right," "Left," or "Stop" signaling means, when once set, will be automatically returned to normal after turning a corner. Should the driver desire to restore the signals to normal before turning a corner, he pushes button 15 momentarily to manually break the circuit and thus restore the parts.

Button 16 is the light-control button and is connected in circuit with the lamp 62 in the rear signal box and the lamp 37 at the pilot-signal.

It will thus be seen that when a certain signal is set, it is automatically restored to normal by the act of steering the car, thereby relieving the driver from the necessity of thinking of resetting or restoring except when he desires to restore before turning a corner.

This device can be easily installed on any car without interfering in any way with its operating parts, and, as both the front and rear signals are connected in the same circuits, the operator or driver of the car can always see by his front or pilot-signal whether the rear signal is properly displayed.

The nature and scope of the invention having been thus indicated and its preferred embodiment having been specifically described, what is claimed as new is:

1. In a motor-vehicle direction-signal system wherein the signal is electro-mechanically operated to set position and automatically reset by the return of the steering mechanism to normal position, a cam-actuating member adapted to be moved by the steering mechanism, a pair of cams positioned to be actuated by the movement of said member, and a normally-closed circuit breaker adapted to be actuated to open position by either one of said cams when said member returns to normal position by the straightening of the steering wheels, said cams being pivotally supported and normally held in inactive position.

2. In a motor-vehicle direction-signal system wherein the signal is electro-mechanically operated to set position and automatically reset by the return of the steering mechanism to normal position, a cam-actuating member movable transversely of the vehicle by movement of the steering mechanism, a pair of pivotally depending cams having their upper ends in the path of movement of said member, spring means normally holding said cams in inactive position, and a normally-closed circuit breaker arranged under the depending ends of said cams, the relation being such that the swinging of either cam in one direction by said member will actuate the circuit breaker to open position and thus permit the signal to be restored to normal.

3. In a motor-vehicle direction-signal system wherein the signal is electro-mechanically operated to set position and automatically reset by the return of the steering mechanism to normal position, a pivoted lever connected to the drag link of the steering gear so as to be swung on its pivot in unison with the movement of the steering mechanism, a normally-closed circuit breaker in the signal circuit, and means actuated by the movement of said member for opening said circuit when said member is returned to normal position with the straightening of the steering wheels.

In testimony whereof I hereunto affix my signature.

SAMUEL H. BOITNOTT.

Witnesses:
 A. C. HOPWOOD,
 STEWART BRITTS.